United States Patent
Kang et al.

(10) Patent No.: US 7,267,312 B2
(45) Date of Patent: Sep. 11, 2007

(54) DISPLAY APPARATUS

(75) Inventors: Byung-jo Kang, Suwon-si (KR); Kyung-tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 10/950,580

(22) Filed: Sep. 28, 2004

(65) Prior Publication Data

US 2005/0082440 A1    Apr. 21, 2005

(30) Foreign Application Priority Data

Oct. 17, 2003    (KR) .................... 10-2003-0072535

(51) Int. Cl.
*G12B 9/10* (2006.01)

(52) U.S. Cl. .............. 248/291.1; 248/397; 248/917; 248/921; 16/337; 16/342; 361/681

(58) Field of Classification Search .......... 248/125.9, 248/371, 372.1, 393, 397, 288.11, 291.1, 248/292.12, 292.13, 917, 921, 923; 16/337, 16/342

See application file for complete search history.

(56) References Cited

U.S. PATENT DOCUMENTS

| | | | | |
|---|---|---|---|---|
| 5,812,368 | A * | 9/1998 | Chen et al. ................ | 361/681 |
| 6,018,847 | A * | 2/2000 | Lu ............................. | 16/337 |
| 6,163,928 | A * | 12/2000 | Chung ....................... | 16/342 |
| 6,168,124 | B1 * | 1/2001 | Matsuoka et al. ......... | 248/176.1 |
| 6,229,584 | B1 * | 5/2001 | Chuo et al. ................ | 349/58 |
| 6,231,021 | B1 * | 5/2001 | Hong ......................... | 248/371 |
| 6,378,830 | B1 * | 4/2002 | Lu ............................. | 248/278.1 |
| 6,476,884 | B1 * | 11/2002 | Shao ......................... | 349/58 |
| 6,532,628 | B2 * | 3/2003 | Kim .......................... | 16/342 |
| 6,581,893 | B1 * | 6/2003 | Lu ............................. | 248/291.1 |

(Continued)

FOREIGN PATENT DOCUMENTS

CN    1420502    5/2003

(Continued)

OTHER PUBLICATIONS

Chinese Office Action issued on Jul. 14, 2006 with respect to Chinese Patent Application No. 200410078681.X, which corresponds to the above-referenced application.

(Continued)

*Primary Examiner*—Anita M. King
(74) *Attorney, Agent, or Firm*—Staas & Halsey LLP

(57) ABSTRACT

A display apparatus in which a monitor is firmly supported by a stand mounted with a hinge and is tilted at a predetermined angle. The display apparatus includes a monitor displaying a picture thereon, and a stand supporting the monitor. The stand includes a stand base, a hinge bracket placed on the stand base and formed with an opened hinge accommodating part at a side thereof, a hinge including a first part accommodated in and connected to the hinge accommodating part of the hinge bracket, a second part connected to a back of the monitor, and a tilt restrictor to restrict a tilt of the monitor; and a hinge bracket cover detachably coupled to the hinge accommodating part formed in the hinge bracket. The present invention provides a display apparatus improved in assembling efficiency and design.

14 Claims, 6 Drawing Sheets

U.S. PATENT DOCUMENTS

| | | | |
|---|---|---|---|
| 6,601,810 B2 * | 8/2003 | Lee | 248/278.1 |
| 6,609,272 B1 * | 8/2003 | Lee | 16/307 |
| 6,695,274 B1 * | 2/2004 | Chiu | 248/371 |
| 6,698,063 B2 * | 3/2004 | Kim et al. | 16/337 |
| 6,822,857 B2 * | 11/2004 | Jung et al. | 361/681 |
| 2004/0211866 A1 * | 10/2004 | Jung et al. | 248/133 |
| 2005/0023418 A1 * | 2/2005 | Kim | 248/121 |

FOREIGN PATENT DOCUMENTS

| | | |
|---|---|---|
| JP | P2002-106542 A | 4/2002 |
| KR | 1999-012655 | 4/1999 |
| KR | 2000-16094 | 8/2000 |
| KR | 20-295979 | 11/2002 |
| KR | 10-364732 | 12/2002 |
| KR | 2003-0056775 | 7/2003 |

OTHER PUBLICATIONS

Chinese Office Action issued Feb. 2, 2007 in corresponding Chinese Application No. 200410078681.X.

* cited by examiner

DISPLAY APPARATUS

CROSS-REFERENCE TO RELATED APPLICATIONS

This application claims the benefit of Korean Patent Application No. 2003-72535, filed Oct. 17, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus in which a monitor is firmly supported by a stand mounted with a hinge and is tilted at a predetermined angle.

2. Description of the Related Art

Generally, a display apparatus collectively refers to a device to visually provide information or graphics on a screen. As a kind of a flat-panel display apparatus, particularly, an LCD (Liquid Crystal Display) apparatus is widely used in a monitor for a computer, a television, etc., and this trend causes demand therefore to increase.

Further, the display apparatus is being variously developed in consideration of function and design to meet a user's various needs.

A conventional display apparatus comprises a monitor displaying a picture thereon, and a stand to support the monitor. Such a display apparatus has been disclosed in Korean Utility Model No. 20-292979, Korean Utility Model first Publication No. 2000-16049, Korean Patent No. 10-364732, and Japanese Patent Publication No. 2002-106542.

However, in the conventional display apparatus, the stand connected to a back of the monitor has a relatively complicated structure, so that the number of required elements is increased, thereby decreasing assembling efficiency and increasing an assembling time. Particularly, a hinge being is the most expensive feature in the stand, and this feature, among others, causes the production cost of the stand to be increased.

SUMMARY OF THE INVENTION

Accordingly, it is an aspect of the present invention to provide a display apparatus in which a stand is simplified in structure, so that assembling efficiency and design are enhanced.

Additional aspects and/or advantages of the invention will be set forth in part in the description which follows and, in part, will be obvious from the description, or may be learned by practice of the invention.

The foregoing and/or other aspects of the present invention are achieved by providing a display apparatus comprising a monitor displaying a picture thereon, and a stand supporting the monitor. The stand comprises a stand base, a hinge bracket placed on the stand base and formed with an opened hinge accommodating part at a side thereof, a hinge comprising a first part accommodated in and connected to the hinge accommodating part of the hinge bracket, a second part connected to a back of the monitor, a tilt restrictor to restrict a tilt of the monitor, and a hinge bracket cover detachably coupled to the hinge accommodating part formed in the hinge bracket.

According to an aspect of the invention, the hinge comprises a lower body accommodated in and connected to the hinge accommodating part of the hinge bracket, a pivot coupled to an upper part of the lower body, an upper body pivotally coupled to the pivot and connected the back of the monitor, and a friction spring placed on the pivot to provide friction when the upper body is pivoted. The tilt restrictor comprises a pair of stoppers spaced from each other and formed in one of the lower body and the upper body, and a protrusion formed in the other one and moving between the stoppers.

According to another aspect of the invention, the upper body comprises a supporter connected to the back of the monitor, and a pivoting part integrally formed with the supporter, accommodating the pivot, and being in contact with the friction spring.

According to another aspect of the invention, one of the hinge bracket and the hinge bracket cover is formed with at least one coupling projection, and the other one is formed with a coupling hole corresponding to the coupling projection.

According to another aspect of the invention, the hinge is formed with an auxiliary coupling hole, and the hinge bracket cover is formed with an auxiliary coupling projection corresponding to the auxiliary coupling hole.

According to another aspect of the invention, the hinge bracket cover is formed with a grip.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
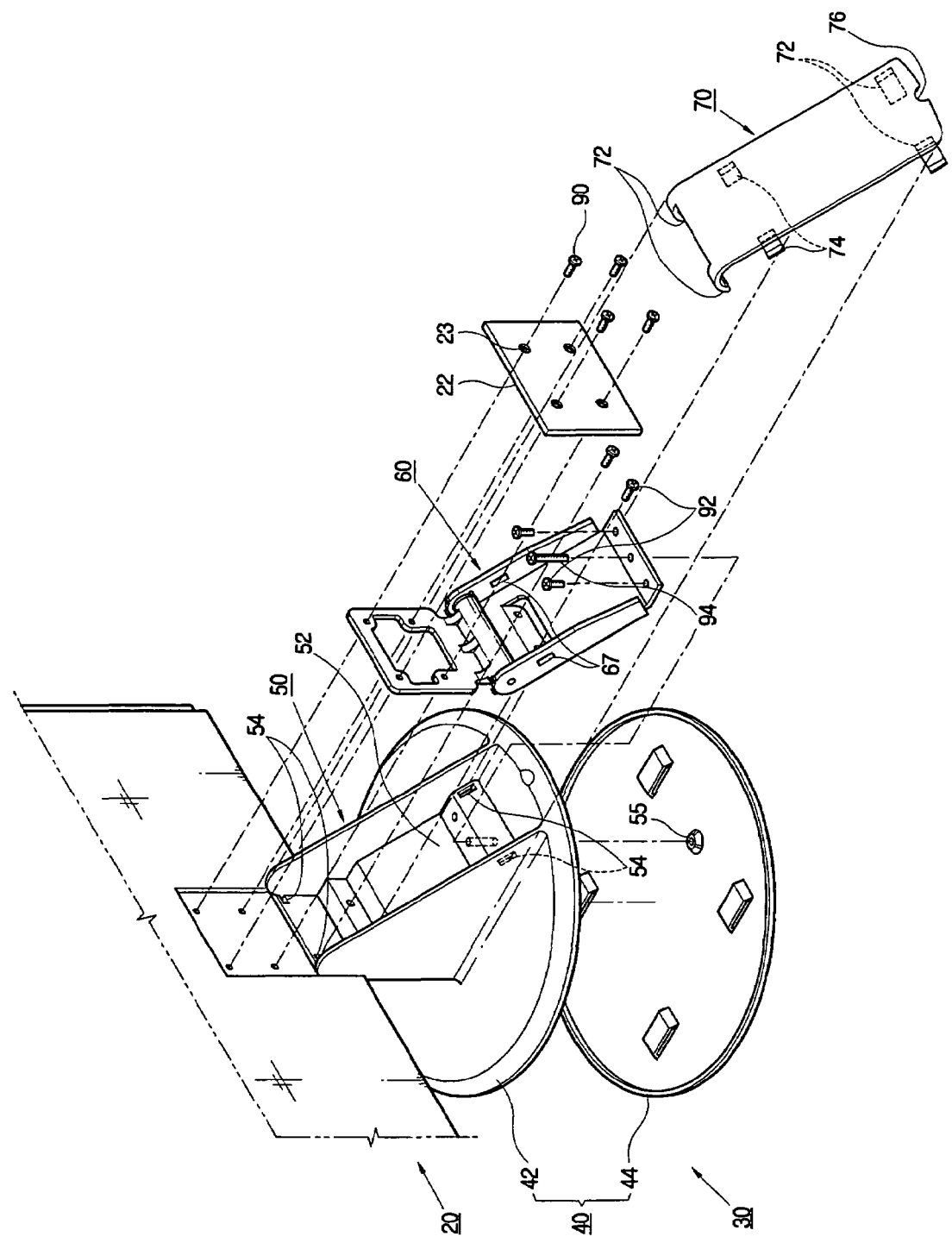
FIG. 1 is an exploded perspective view of a display apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
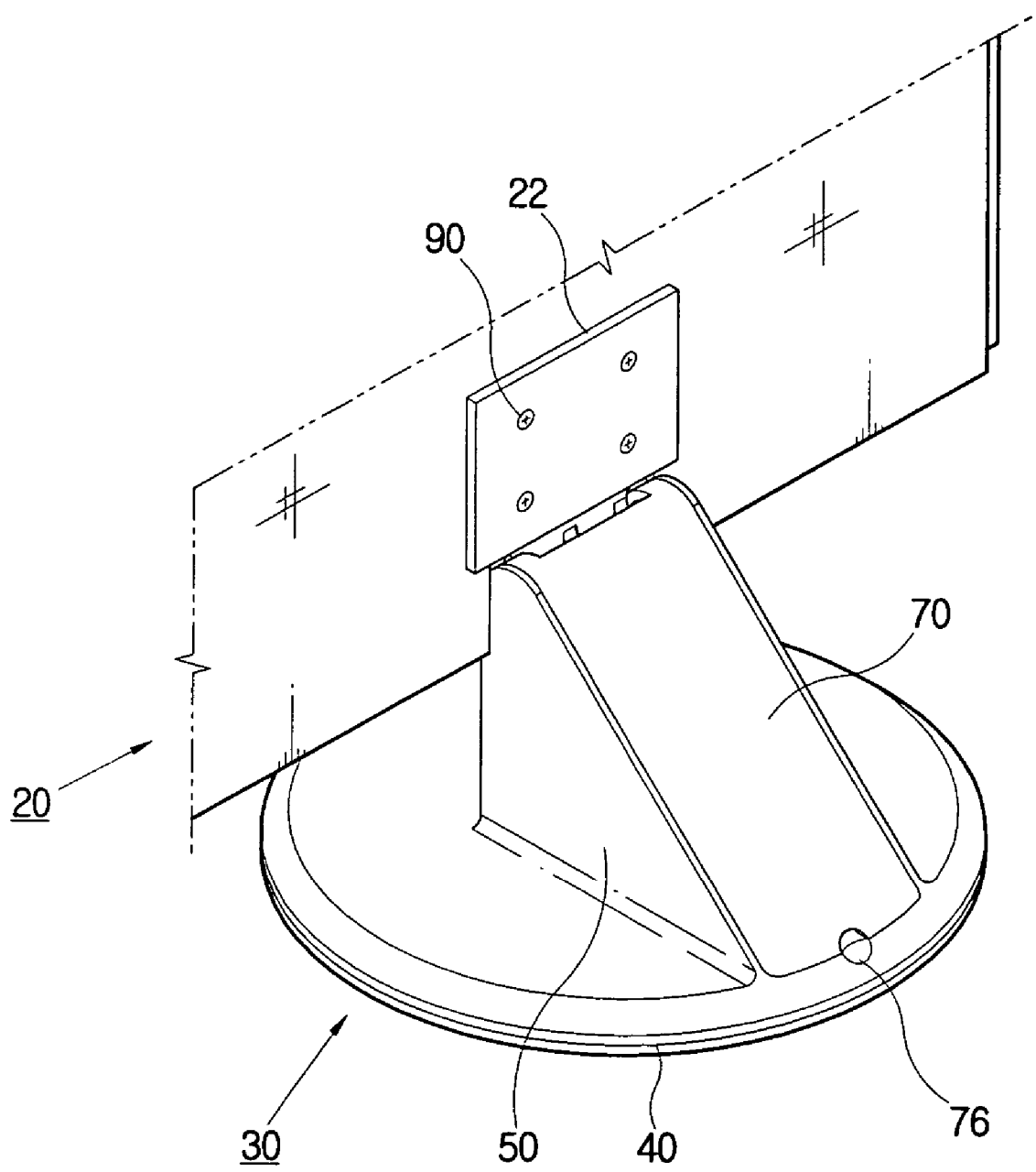
FIG. 2 is an assembled perspective view of the display apparatus of FIG. 1.

FIG. 1 is an exploded perspective view of a display apparatus according to an embodiment of the present invention, and FIG. 2 is an assembled perspective view of the display apparatus of FIG. 1.

As shown therein, a display apparatus according to an embodiment of the present invention comprises a monitor 20 displaying a picture thereon, and a stand 30 connected to a back of the monitor 20 and supporting the monitor 20.

The stand 30 comprises a stand base 40. A hinge bracket 50 is placed on the stand base 40 and is formed with an opened hinge accommodating part 52 at a side thereof. A hinge 60 having a first part accommodated in and connected to the hinge accommodating part 52 of the hinge bracket 50 and a second part connected to the back of the monitor 20 cooperate with each other to allow the monitor 20 to be tilted relative to the stand 30. A hinge bracket cover 70 is detachably coupled to the hinge accommodating part 52 formed in the hinge bracket 50.

The back of the monitor 20 is provided with a connector 22 having screw holes 23 and is connected to the first part of the hinge 60 by at least a first screw 90. Considering an outer appearance, the connector 22 has a structure of preventing the hinge 60 from being exposed to the outside.

The stand base 40 is shaped like a circular plate and includes an upper base 42 and a lower base 44, which are detachably coupled to each other. The stand base may vary in structure and shape.

The hinge accommodating part 52 of the hinge bracket 50 may vary according to the size and the structure of the hinge 60, and the hinge 60 is accommodated in and connected to the hinge accommodating part 52 of the hinge bracket 50 by a second screw 92 and a third screw 94. Here, the third screw 94 passes through the hinge 60 and the hinge bracket 50 and is coupled to a screw coupling part 55 formed in the lower base 44 of the stand base 40, thereby connecting the hinge 60 with the stand 30 firmly.

Further, the hinge 60 is sturdy and is made of a material which has a sufficient solidity to firmly support the monitor.

The hinge bracket cover 70 is formed with coupling projections 72, and the hinge bracket 50 is formed with coupling holes 54 corresponding to the coupling projections 72 of the hinge bracket 70. The structure between the coupling projection 72 of the hinge bracket cover 70 and the coupling holes 54 of the hinge bracket 50 may vary as long as the hinge bracket cover 70 and the hinge bracket 50 can be firmly coupled to each other. The coupling projection 72 and the coupling hole 54 may have a hook-coupling structure to allow the hinge bracket cover 70 to be easily coupled to and detached from the hinge bracket 50. Further, the coupling projection and the coupling hole may be reversed with respect to each other as necessary.

The hinge 60 is formed with auxiliary coupling holes 67, and the hinge bracket cover 70 is formed with auxiliary coupling projections 74 corresponding to the auxiliary coupling holes 67 of the hinge 60, thereby coupling the hinge bracket cover 70 with the hinge 60 firmly.

The hinge bracket cover 70 is formed with a grip 76 shaped like a hole to allow a user to easily detach the hinge bracket cover 70 from the hinge 60 when replacement or repair of the hinge 60 becomes necessary.

Figure 3:
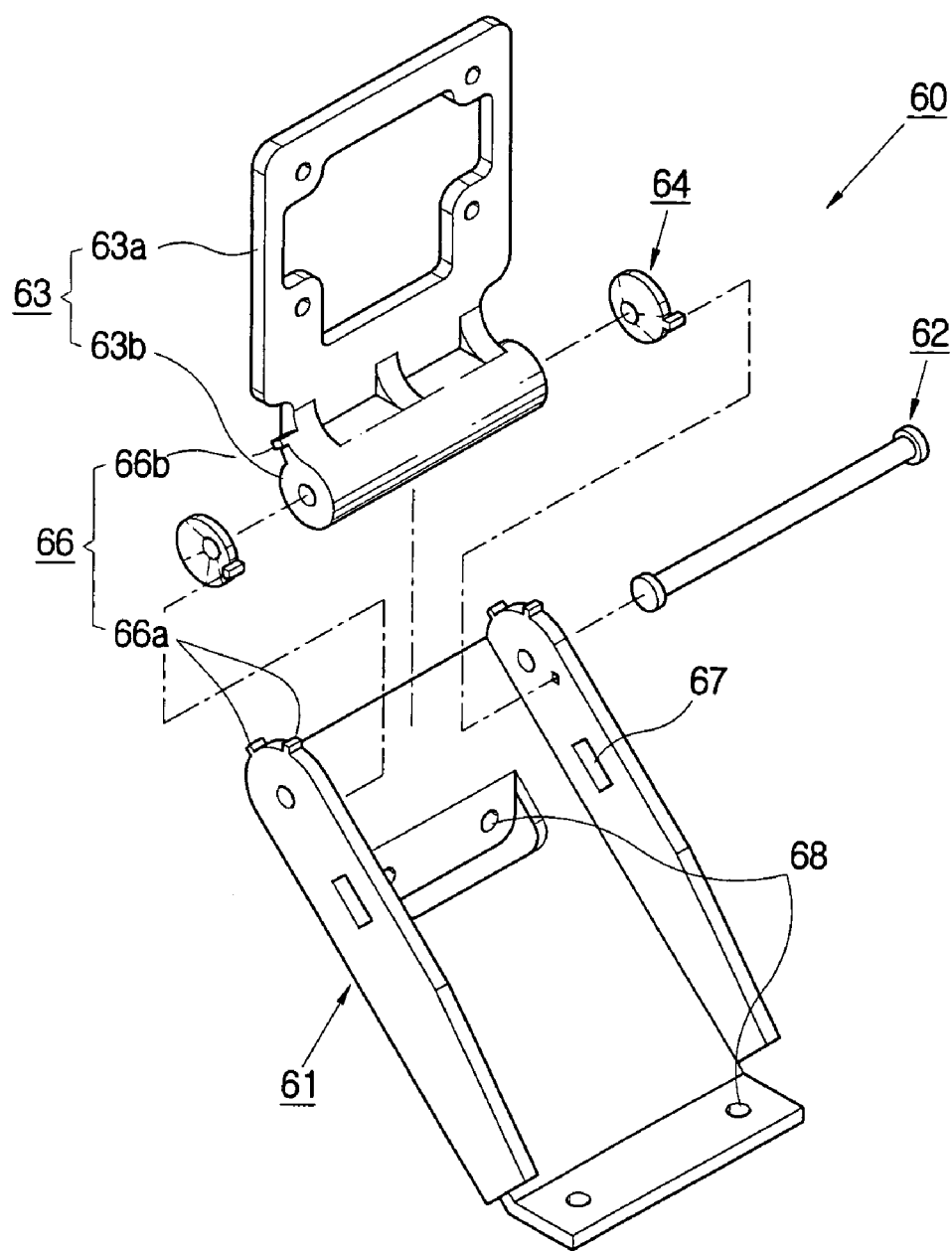
FIG. 3 is an exploded perspective view of a hinge mounted to a stand of the display apparatus shown in FIG. 1.
Figure 4:
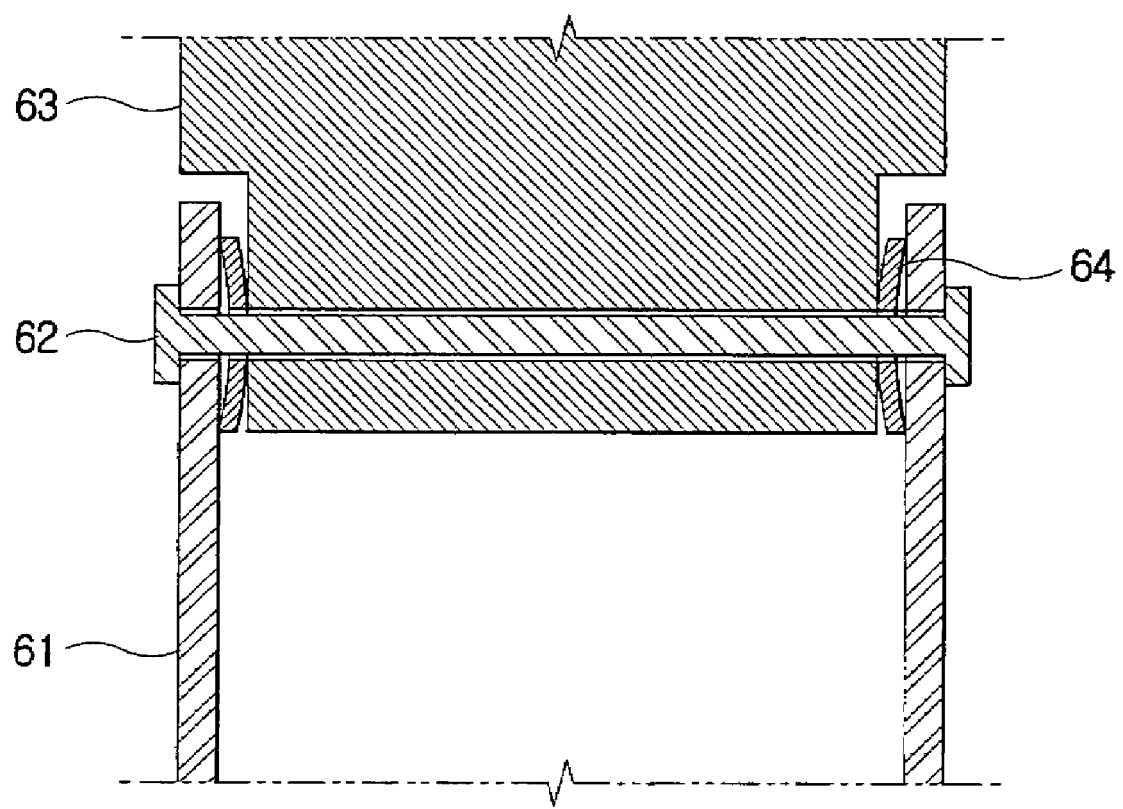
FIG. 4 is a sectional view to illustrate a rotation structure of the hinge mounted to the stand of the display apparatus shown in FIG. 2.
Figure 5A:
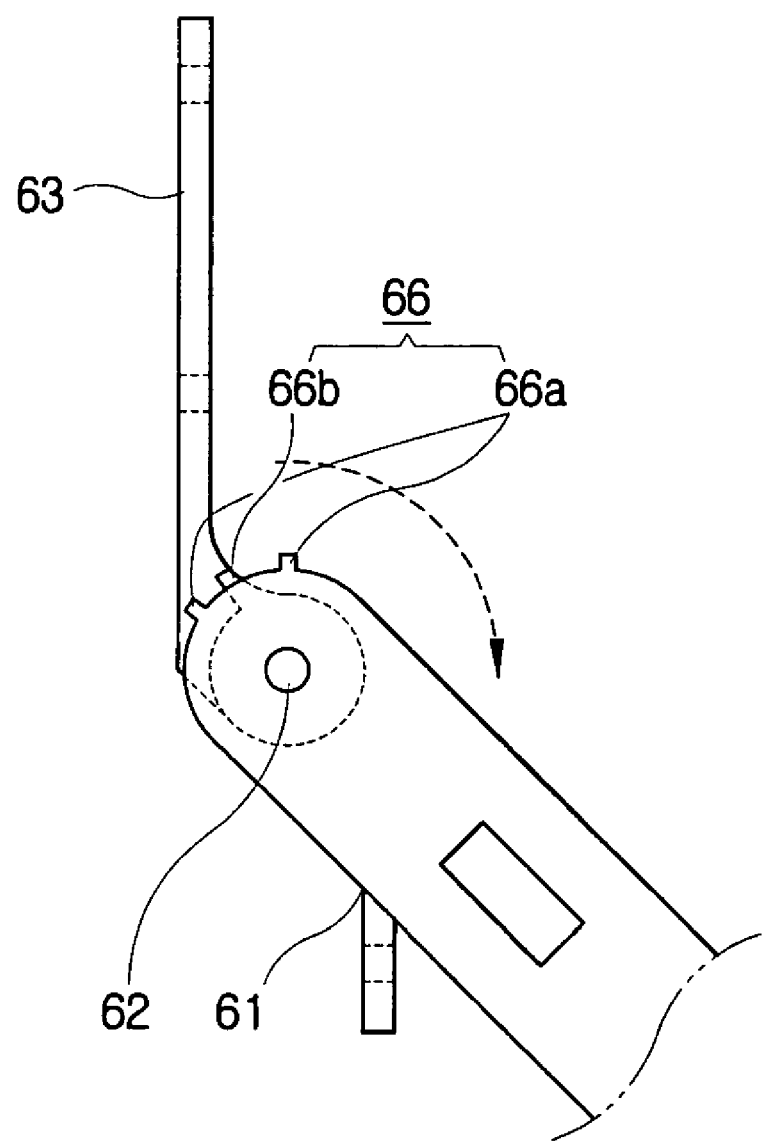
FIGS. 5A and 5B are side views to illustrate the rotation structure of the hinge mounted to the stand of the display apparatus shown in FIG. 2.
Figure 5B:
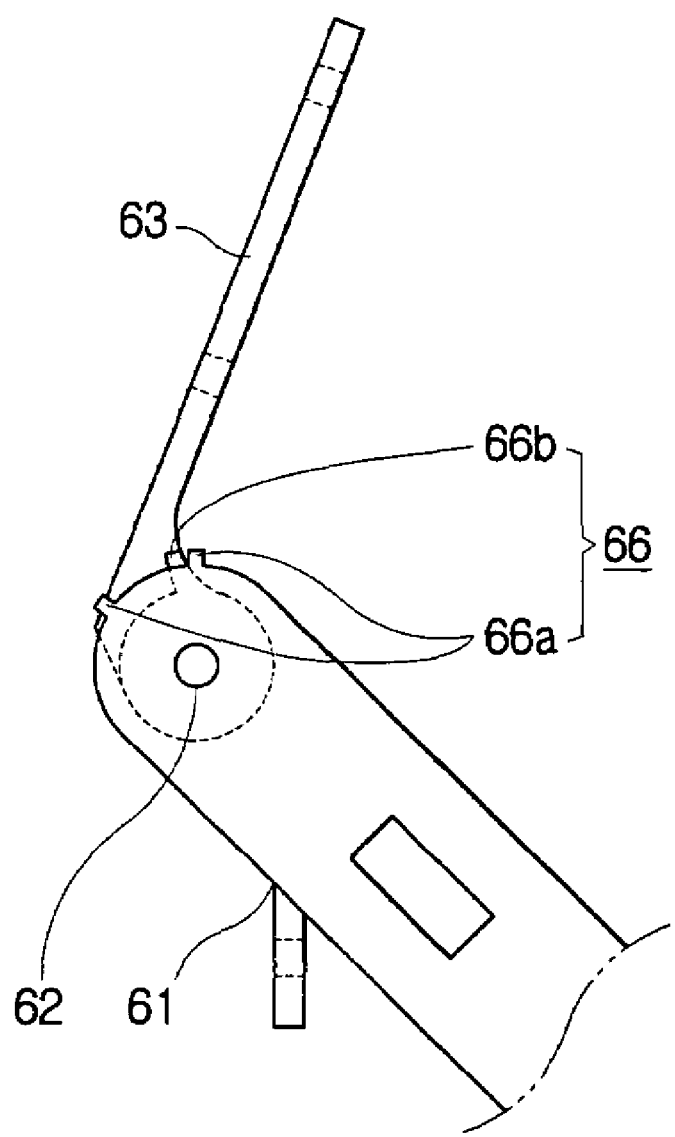

FIG. 3 is an exploded perspective view of the hinge of the display apparatus shown in FIG. 2, FIG. 4 is a sectional view to illustrate a rotation structure of the hinge of the display apparatus shown in FIG. 2, and FIGS. 5A and 5B are side views to illustrate the rotation structure of the hinge of the display apparatus shown in FIG. 2. Besides FIGS. 3, 4, 5A and 5B, FIGS. 1 and 2 will help a user's understanding of a connecting structure of the hinge.

As shown therein, the hinge 60 comprises a lower body 61 accommodated in and connected to the hinge accommodating part 52 of the hinge bracket 50. A pivot 62 is coupled to an upper part of the lower body 61. An upper body 63 is pivotally coupled to the pivot 62 and connected to the back of the monitor 20. A friction spring 64, being placed on the pivot 62, provides friction when the upper body 63 is pivoted.

The lower body 61 is shaped like a plate of which opposite sides are bent and is formed with the auxiliary coupling holes 67 and screw holes 68.

The pivot 62 is formed as a single body and coupled to the lower body 61.

The upper body 63 comprises a supporter 63a connected to the back of the monitor 20, and a pivoting part 63b. The pivoting part 63b is integrally formed with the supporter 63a, to accommodate the pivot 62, and to contact the friction spring 64.

The friction spring 64 is interposed between the bent part of the lower body 61 and the pivoting part 63b of the upper body 63. Here, the structure of the friction spring may vary as long as the friction spring offers the friction when the upper body 63 is pivoted.

Additionally, the hinge 60 comprises a tilt restrictor 66 to restrict a tilt of the monitor 20. The tilt restrictor 66 comprises a pair of stoppers 66a, which are spaced from each other and formed in either one of the lower body 61 and the upper body 63, and a protrusion 66b. The protrusion 66b is formed in the other one of the lower body 61 and the upper body 63 and moves between the stoppers 66a. Here, the structure of the tilt restrictor may vary as long as the tilt restrictor can restrict the tilt of the monitor 20.

In the embodiment of the invention illustrated by FIG. 3, the tilt restricting aspect of the invention is achieved as follows. At a starting position, once the display apparatus has been assembled, the protrusion 66b contacts an inside facing surface of the one of the pair of stoppers 66a (e.g. the protrusion which is closer to the monitor 20). As the monitor 20 and the upper body 63 are rotated clockwise about the pivot 62, the cooperation between the pivot 62 and the friction spring 64 impedes or slows the rotation of the monitor 20 and the upper body 63. As the rotation is completed, the protrusion 66b comes into contact with an inside surface of the other one of the pair of stoppers 66a.

As described above, the present invention provides a display apparatus in which a stand is simplified in structure, so that assembling efficiency and design are enhanced, thereby reducing production cost of the stand.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A stand of a display apparatus to support a monitor on which a picture is displayed thereon, comprising:
    a base;
    a hinge bracket placed on the base and formed with an opened hinge accommodating part at a side thereof;
    a hinge including a first part, which is accommodated in and connected to the hinge accommodating part, a second part connected to a back of the monitor, a tilt restrictor to restrict a tilt of the monitor, a pivot coupled to an upper part of the first part, the second part being pivotally coupled to the pivot, and a friction spring, on the pivot, to provide friction when the second part is pivoted; and
    a hinge bracket cover detachably coupled to the hinge accommodating part formed in the hinge bracket.

2. The display apparatus according to claim 1, wherein: the tilt restrictor comprises:
    a pair of stoppers spaced from each other and formed in one of the first part and the second part, and a protrusion formed in the other one of the first part and the second part to move between the stoppers.

3. The display apparatus according to claim 1, wherein the second part comprises:
   a supporter connected to the back of the monitor; and
   a pivoting part integrally formed with the supporter, to accommodate the pivot, and to contact the friction spring.

4. The display apparatus according to claim 1, wherein one of the hinge bracket and the hinge bracket cover comprises at least one coupling projection, and the other one of the hinge bracket and the hinge bracket cover comprises a coupling hole corresponding to the coupling projection.

5. The display apparatus according to claim 4, wherein the hinge comprises an auxiliary coupling hole, and the hinge bracket cover comprises an auxiliary coupling projection corresponding to the auxiliary coupling hole.

6. The display apparatus according to claim 1, wherein one of the hinge bracket and the hinge bracket cover comprises at least one coupling projection, and the other of the hinge bracket and the hinge bracket cover comprises a coupling hole corresponding to the coupling projection.

7. The display apparatus according to claim 6, wherein the hinge comprises an auxiliary coupling hole, and the hinge bracket cover comprises an auxiliary coupling projection corresponding to the auxiliary coupling hole.

8. The display apparatus according to claim 3, wherein one of the hinge bracket and the hinge bracket cover comprises at least one coupling projection, and the other one comprises a coupling hole corresponding to the coupling projection.

9. The display apparatus according to claim 8, wherein the hinge comprises an auxiliary coupling hole, and the hinge bracket cover comprises an auxiliary coupling projection corresponding to the auxiliary coupling hole.

10. The display apparatus according to claim 1, wherein the hinge bracket cover comprises a grip.

11. The display apparatus according to claim 1, wherein one of the hinge bracket and the hinge bracket cover comprises at least one coupling projection.

12. The display apparatus according to claim 11, wherein the other one of the hinge bracket and the hinge bracket cover comprises a coupling hole corresponding to the coupling projection.

13. The display apparatus according to claim 12, wherein the hinge comprises an auxiliary coupling hole.

14. A stand of a display apparatus, comprising:
   a hinge, the display apparatus being tilted about the hinge;
   a tilt restrictor to restrict the tilt of the display apparatus, the tilt restrictor comprising:
      a lower body including a stopper protruding therefrom, having a pair of inside surfaces;
      an upper body to frictionally rotate with the display apparatus about the lower body;
      a protrusion on the upper body to contact the inside surfaces of the stopper to impede the rotation of the upper body; and
      a friction spring interposed between the lower body and the upper body;
   a hinge bracket to accommodate the hinge; and
   a hinge bracket cover attached to the hinge bracket, the hinge bracket cover comprising a grip.

* * * * *